March 24, 1931.    G. VON HEYMAN    1,797,740
CHANGE SPEED GEARING
Filed April 7, 1928
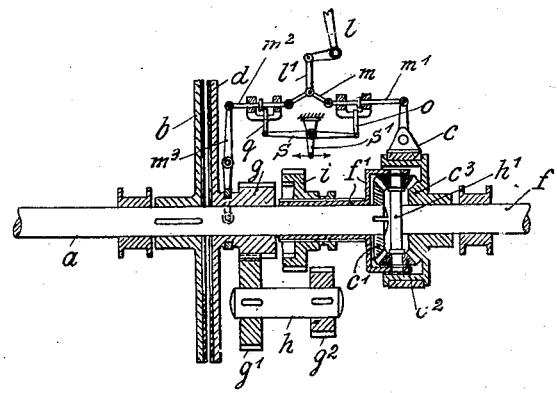
Inventor:
Günter v. Heyman
by C. P. Goepel
his Atty.

Patented Mar. 24, 1931

1,797,740

UNITED STATES PATENT OFFICE

GÜNTER VON HEYMAN, OF BERLIN-SCHONEBERG, GERMANY

CHANGE-SPEED GEARING

Application filed April 7, 1928, Serial No. 268,106, and in Germany April 12, 1927.

This invention relates to a change-speed gearing intended chiefly for motor vehicles, but it also may be used in connection with machines of various descriptions. The mechanism is so designed that it permits quick, convenient and reliable operation. It comprises a combination of change-speed gears with a friction coupling or other form of releasable clutch, and with axially shiftable sets of cog-wheels which are in a certain particular connection with a planetary gear train. By this arrangement, the planetary gear train is employed only at a medium speed lying between a higher and a lower speed, and is actuated by effecting a braking action upon one of the gears of the train. The planetary gear train is arranged between the driving and driven shafts and in such a way that one member of the train is mounted upon the driving shaft while another member is mounted upon the driven shaft.

The speed may be changed quickly by disconnecting or uncoupling the friction coupling and instantly thereafter effecting the braking action upon the braking member of the planetary gear train. Both these actions may be effected by the same pedal or operating means. The cog-wheels for operating at the third speed can be brought into mesh while the motor is driving the vehicle at the second speed. Under the arrangement, there are two parallel, but differently effective systems, of which the one includes the change-speed cog wheels for producing the first and third speeds, whereas the other includes the planetary gear train for producing a medium speed lying between the first and third speeds.

In carrying out my invention in its preferred form of construction, one member of the planetary gear train is made in the form of a brake drum and the means for controlling the operation of the brake drum is arranged to be controlled by the same means or mechanism which controls the operation of the friction coupling and hence the operation of the cog-wheels for the first and third speeds.

The invention consists in the construction and arrangement of parts hereinafter described and claimed.

A simple embodiment of my invention is illustrated by way of example in the accompanying drawing, and it will be understood that no limitations are necessarily made to the precise structural features therein exhibited, but that changes, alterations, and modifications within the scope of the claims may be resorted to when desired.

The accompanying drawing represents a longitudinal central section of a power transmission embodying the change speed gearing of my invention.

In the drawing, $a$ denotes the motor shaft, $b$ and $d$ denote a suitable form of friction coupling, $g$ a cog-wheel connected with the coupling disk $d$ and shiftable upon the shaft $a$. $g^1$ is a cog-wheel which meshes with said wheel $g$ and is keyed to a counter-shaft $h$ to which is keyed also a cog-wheel $g^2$ arranged to be engaged by a cog-wheel $i$ located upon a sleeve $f^1$. The cog-wheel $i$ has an external toothing for co-operation with the cog-wheel $g^2$ and an internal toothing for co-operation with the cog-wheel $g$. Said cog-wheel $i$ is constructed to be shifted axially upon the sleeve $f^1$ by any suitable means (none shown) such as a shiftable lever operable by a foot pedal or the like.

When the coupling disc $d$ is moved into driving engagement with the coupling disc $b$, the cog-wheels $g$, $g^1$ and $g^2$ will be operated in an obvious manner from the motor shaft $a$. If during the operation of these cog-wheels, the cog-wheel $i$ be moved axially upon the sleeve $f^1$ into engagement with the wheel $g^2$, the transmission shaft $f$ will be operated at first speed through the connection between the shafts $a$ and $f$ of the planetary gear train which will presently be described.

If, instead of being moved into engagement with the wheel $g^2$, said cog-wheel $i$ be moved in the opposite direction where it will engage with the wheel $g$, then the shaft $f$ will be operated at third speed.

The planetary gear train comprises a bevel wheel $c^1$ keyed to the adjacent end of the motor shaft $a$, bevel-wheels $c^2$ attached to the opposite ends of the cross-member $h^1$ and meshing with the wheel $c^1$, and a bevel-wheel $c^3$ meshing with the wheels $c^2$. As shown in the drawing the cross member $h^1$ is carried by the sleeve $f^1$ applied to the transmission shaft $f$, is designed as a brake drum and it is surrounded by a cooperating brake band $c$. A movable rod $m^1$ connects the brake band $c$ with a toggle-joint lever $m$, the other end of which is connected by an axially movable rod $m^2$ with a double-armed lever $m^3$ engaging the sleeve or hub connecting the cog-wheel $g$ and the brake-disk $d$ with each other. The toggle-joint lever is connected also with a rod $l^1$ transmitting to it the power exerted upon a foot lever $l$. The rods $m^1$ and $m^2$ are each provided with a collar located between the bearing provided for each of these rods and co-operating with vertically movable rods $o$ and $q$ hinged to the ends of a double-armed lever $s$ firmly connected with a short arm $s^1$ by which either the rod $o$ is moved into the path of the collar of the rod $m^1$ or the rod $q$ is moved into the path of the collar of the rod $m^2$. The means for actuating the lever $s$ are not shown in this figure. The rods $o$ and $q$ may also be termed locking bolts.

In the position of the parts, as shown, the cog-wheel $i$ is in its middle position in which it meshes neither with the cog-wheel $g$, nor with the cog-wheel $g^2$. The disk brake $b$, $d$ is disengaged at the time being. The rod or locking bolt $q$ is locking the rod $m^2$ and it is, therefore, impossible to move the disk $d$ against the disk $b$ by the lever $m^3$, but the band brake $c$ can be actuated by the foot lever $l$, in that the rod $m^1$ is not locked.

When through the operation of the foot lever, the brake drum $c^3$ is held inoperative by the brake band $c$, the transmission shaft $f$ will be operated at second speed through the planetary gear train.

The change speed gearing of my invention, therefore, is so arranged that the first and third speeds are controlled by the foot lever independently of the third speed, it being only necessary in order to change from the first to the third speed to shift the wheel $i$ from engagement with the wheel $g^2$ into engagement with the wheel $g$. For the third speed, the wheel $i$ is put in neutral position where it is out of engagement with both wheels $g^2$ and $g$, and the foot lever is actuated so as to render the coupling disc $d$ inoperative and the brake band $c$ operative.

The gearing arrangement shown and described is distinguished from the known one-coupling gearing arrangement with axially shiftable sets of change-wheels by the feature that a second friction coupling is provided. The object of this second friction coupling is to obtain a medium speed lying between a lower and a higher one.

I claim:

1. A change speed gearing comprising driving and driven shafts, a friction coupling associated with the driving shaft, a train of change speed gears including two shiftable gears upon the driving shaft, one of which controls the friction coupling and the second of which controls the change of speed, said gear train also including two additional gears upon a countershaft, one of the additional gears being in mesh with the first of said shiftable gears, while the other of the additional gears is arranged to be engaged by the second of the shiftable gears, and a planetary gear train connected independently with the driving shaft and one of the shiftable gears whereby it is adapted to function either as a transmission between said driving and driven shafts, or as a transmission between the second of said shiftable gears and said driven shaft.

2. A change speed gearing comprising driving and driven shafts, a train of change speed gears including a shiftable gear upon the driving shaft arranged to control change of speed, a sleeve on the driving shaft constituting transmission from the shiftable gear, driven gearing under the control of the driving shaft and including a member with which said shiftable gear is engageable so as to be operated through the driven gearing and a planetary gear train connected separately with the driving shaft and the shiftable gear whereby it is adapted to function either as a transmission between said sleeve and driven shaft, or as a transmission between said driving and driven shafts.

3. A change speed gearing comprising driving and driven shafts, a countershaft parallel with the driving shaft, a train of change speed gears including two gears upon the driving shaft and two cooperating gears rigid with the countershaft, one of the gears on the driving shaft being shiftable between the other gear thereon and one of the gears on the countershaft whereby to effect change in speed, a sleeve on the driving shaft constituting transmission from the shiftable gear, a planetary gear train connected separately with the driving shaft and the shiftable gear whereby it is adapted to function either as a transmission between said sleeve and driven shaft, or as a transmission between said driving and driven shafts, and control means for rendering the planetary gear inoperative with respect to the sleeve when it is operative with respect to the driving shaft.

4. In a change speed gearing, the combination of a friction coupling movable to and from a position to operate a change speed gearing associated with a driving shaft, said change speed gearing including two gears upon the driving shaft, a countershaft, two gears on the countershaft cooperating respectively with the gears on the driving shaft, one of the gears on the driving shaft being shiftable between the other gear thereon and one of the gears on the countershaft whereby to effect change in speed, a planetary gear train connected separately with a member of the change speed gearing and with the driving shaft, and including a control for controlling transmission to a driven shaft, and means for rendering the operative connection between the planetary gearing train and the driving shaft inoperative when said coupling is moved to position for operating the change speed gearing.

5. In a change speed gearing, the combination of a friction coupling, a change speed gearing associated with a driving shaft, means for rendering the friction coupling operative and inoperative for driving the change speed gearing from the driving shaft, a planetary gear train connected separately with a member of the change speed gearing and with the driving shaft, and constituting transmission to a driven shaft, control means for rendering the planetary gear inoperative with respect to the change speed gearing when it is operative with respect to the driving shaft, and a control common to the coupling and the control for the planetary gear whereby to prevent the operation of the change speed gearing through said coupling when the planetary gear is rendered inoperative with respect to the change speed gearing.

6. A motor vehicle change speed gearing having, in combination, a motor shaft and a driven shaft connected by a planetary gear train, a friction coupling on the motor shaft including a gear part, a shiftable auxiliary gear on the motor shaft adapted to be operated by said gear part and connected, independently of the motor shaft, with a member of the planetary train, a countershaft carrying a pair of gears, one of which is in mesh with said gear part to be thereby operated for operating the countershaft and second gear thereon, which second gear is normally free, said auxiliary gear being shiftable in one direction to engage said gear part for receiving power whereby to operate the planetary train at one speed and also being shiftable in another direction to engage the second countershaft gear for receiving power whereby to operate the planetary gear train at a different speed.

7. A motor vehicle change speed gearing having, in combination, a motor shaft provided with a friction coupling including a gear part, a driven shaft, a planetary gear train connected to operate the driven shaft from the motor shaft, an auxiliary gear on the motor shaft, means connected to be controlled by the auxiliary gear for operating the planetary gear train, said auxiliary gear adapted to be engaged with said gear part for operating the planetary gear train at one speed, a countershaft carrying a gear in mesh with said gear part to be thereby operated, a second gear on the countershaft, and the said auxiliary gear being shiftable relatively to the connected means controlled thereby, from a position in engagement with said gear part to a position in engagement with said second countershaft gear whereby to operate said planetary gear train at a different speed the power for which is received through said countershaft.

In testimony whereof I affix my signature.

GÜNTER v. HEYMAN.